US006587334B2

United States Patent
Chen

(10) Patent No.: US 6,587,334 B2
(45) Date of Patent: Jul. 1, 2003

(54) NOTEBOOK COMPUTER CASE WITH AT LEAST ONE WIRED MODULAR JACK

(75) Inventor: Wen-Liang Chen, Taoyuan (TW)

(73) Assignee: Berg Technology, Inc., Reno, NV (US)

( * ) Notice: Subject to any disclaimer, the term of this patent is extended or adjusted under 35 U.S.C. 154(b) by 101 days.

(21) Appl. No.: 09/825,541

(22) Filed: Apr. 3, 2001

(65) Prior Publication Data

US 2001/0036059 A1 Nov. 1, 2001

Related U.S. Application Data

(60) Provisional application No. 60/196,276, filed on Apr. 6, 2000.

(51) Int. Cl.[7] .................................................. G06F 1/16
(52) U.S. Cl. ....................................... 361/683; 361/686
(58) Field of Search .................................. 361/683, 686

(56) References Cited

U.S. PATENT DOCUMENTS 5,186,646 A * 2/1993 Pederson .................... 439/374
5,505,633 A * 4/1996 Broadbent .................. 439/329
5,562,491 A * 10/1996 Shimirak et al. ........... 439/521
5,704,802 A * 1/1998 Loudermilk ................ 439/460

* cited by examiner

*Primary Examiner*—Darren Schuberg
*Assistant Examiner*—Yean Hsi Chang
(74) *Attorney, Agent, or Firm*—Harrington & Smith, LLP

(57) ABSTRACT

A notebook computer case with at least one modular jack, comprises: an insulation modular jack insert, which comprises a front face and a rear face opposite to the front face, a plurality of parallel channels being formed through the insert between the front face and the rear face; a lower case having a lower side frame which has a top and an outer wall, the lower side frame is configured to downward form a recess from the top thereof, the insert being removably mounted within the recess with the front face being substantially flush with the outer wall; an upper case having an upper side frame which has a bottom and an outer wall being substantially flush with the outer wall of the lower side frame after engagement with the lower case, the upper side frame being configured to upward form at least one cavity from the bottom thereof.

14 Claims, 3 Drawing Sheets

NOTEBOOK COMPUTER CASE WITH AT LEAST ONE WIRED MODULAR JACK

CROSS-REFERENCE TO RELATED APPLICATION

This application claims the benefit under 35 U.S.C. §119 (e) of U.S. provisional patent application No. 60/196,276, filed Apr. 6, 2000 and herein incorporated by reference.

BACKGROUND OF THE INVENTION

1. Field of the Invention

The present invention relates to a notebook computer case with at least one wired modular jack which is co-defined by the notebook computer case and a jack insert such that the height of the computer case can be reduced.

2. Brief Description of Prior Developments

Conventionally, as shown in FIG. 1, a notebook computer case has an outer wall which forms two horizontal slots thereon. A slot is used for receiving a PCMCIA card (for example, a fax/modem card) therein while the other slot is used for receiving a network card therein. After inserting a fax/modem card, a cable is used to connect a jack provided at an end of the fax/modem card and a RJ11 modular jack provided at an end of a telephone line. Similarly, for a network card, a cable is used to connect a jack provided at an end of the network card and a RJ45 modular jack provided at an end of a network line.

The trend in notebook computer production is toward smaller sizes and lighter weights. Great progress in electronic engineering allows the fax/modem card and the network card to be built-in a printed circuit board disposed within the notebook computer, along with a wired RJ11 modular jack and a wired RJ45 modular jack that are provided on the outer wall of the computer case. So, if a dial-up function is to be used, a user only needs to insert a plug provided at an end of the cable into the wired RJ11 modular jack mounted on the outer wall and insert the other provided at the other end of the cable into the other RJ11 modular jack mounted on the wall or the floor. The above operation also applies to the connection between a wired RJ45 modular jack and a network card.

However, since a wired modular jack is larger than an ordinary jack, in order to receive the wired RJ11 and RJ45 modular jacks within the notebook computer case, the notebook computer case must have a certain height to cover the height of the modular jack housing such that the height of the computer case cannot be reduced. In addition, the RJ11 and the RJ45 modular jacks occupy a certain amount of space on the outer wall such that some other devices (for example, COM 1 and COM 2 ports) have to be built on the other sides of the notebook computer, which is very inconvenient when connecting different external equipment (for example, a printer or a scanner) to the computer.

Therefore, there is a need for a combined RJ11/RJ45 modular jack, which is used for the fax/modem and network card built-in a printed circuit board, and can reduce the height of the notebook computer case, as well as the space required for the jack.

SUMMARY OF THE INVENTION

It is an objective of the present invention to provide a notebook computer case with at least one wired modular jack, which is used for the fax/modem and/or network card built in a printed circuit board.

It is another objective of the present invention to provide a notebook computer case with at least one wired modular jack, which reduces the height of the computer case.

It is a third objective of the present invention to provide a notebook computer case with at least one wired modular jack, which reduces the space required for the jack.

To achieve these objectives, the notebook computer case with at least one wired modular jack in accordance with the present invention, comprises: an insulation modular jack insert, which comprises a front face and a rear face opposite to the front face, a plurality of parallel channels being formed through the insert between the front face and the rear face; a lower case having a lower side frame which has a top and an outer wall, the lower side frame is configured to downward form a recess from the top thereof, the insert being removably mounted within the recess with the front face being substantially flush with the outer wall; an upper case having an upper side frame which has a bottom and an outer wall being substantially flush with the outer wall of the lower side frame after engagement with the lower case, the upper side frame being configured to upward form at least one cavity from the bottom thereof; thereby when the upper case is in engagement with the lower case of which the modular jack insert is mounted within the recess, the modular jack insert and at least one of the cavities define the modular jack adapted for insertion of a plug.

The structure and objectives of the present invention will be more readily understood by those skilled in the art from the following description of the preferred embodiments taken in conjunction with the accompanying drawings.

DETAILED DESCRIPTION OF THE PREFERRED EMBODIMENT

Figure 1:
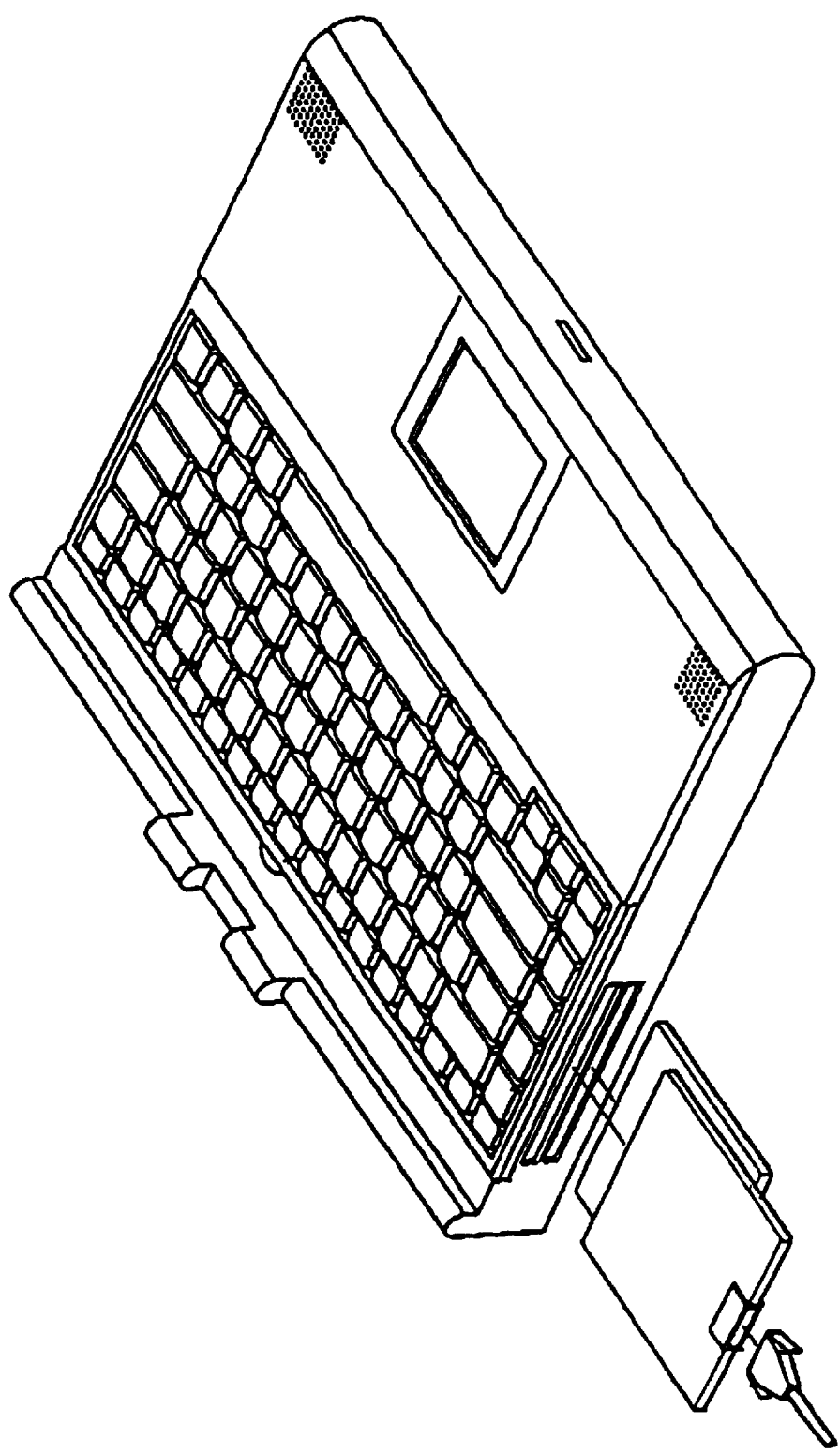
FIG. 1 is a schematic view of a conventional notebook computer case having two horizontal slots on an outer wall.
Figure 2:
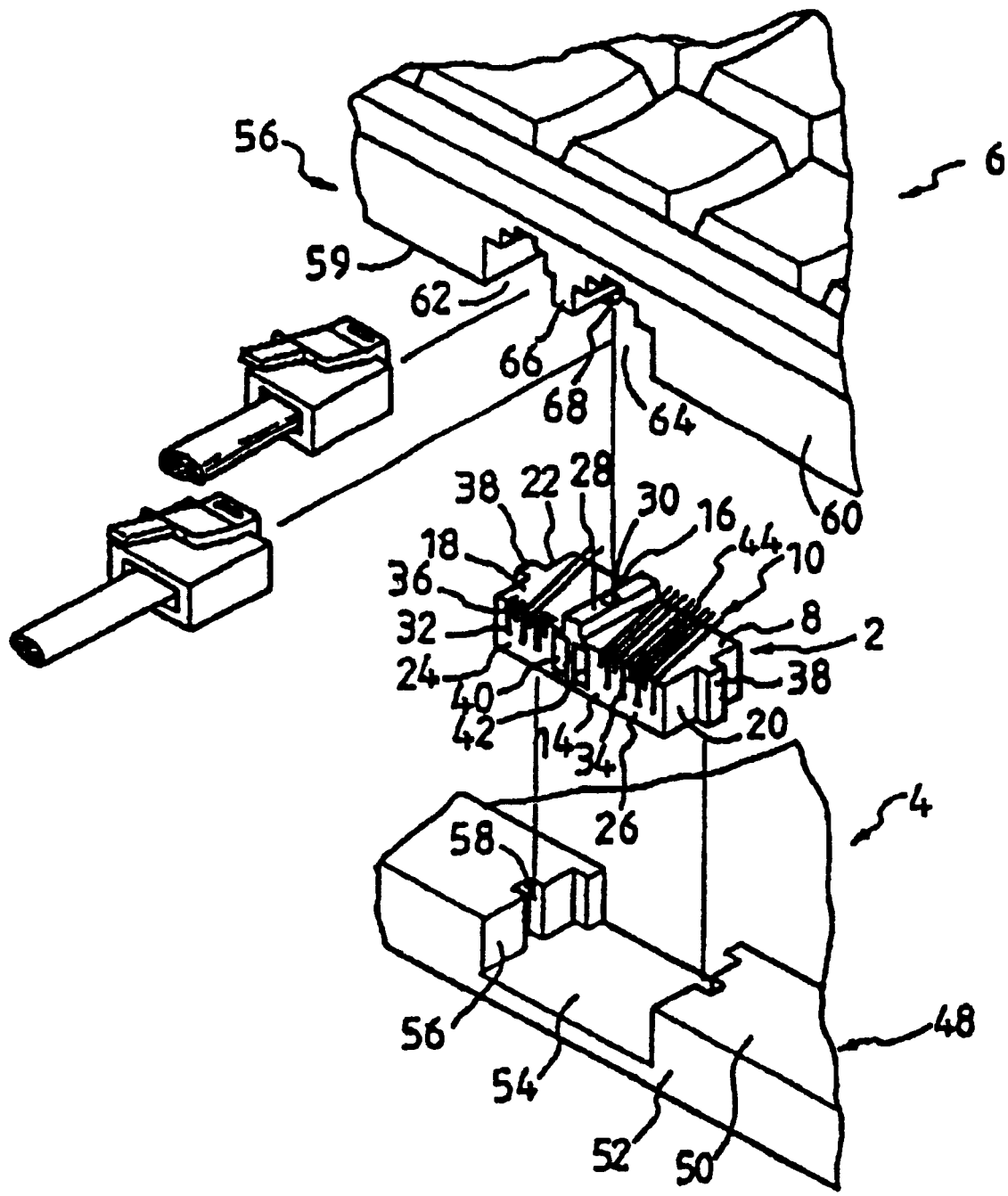
FIG. 2 is a partially exploded view of the notebook computer case showing two wired modular jacks in accordance with a preferred embodiment of the present invention.
Figure 3:
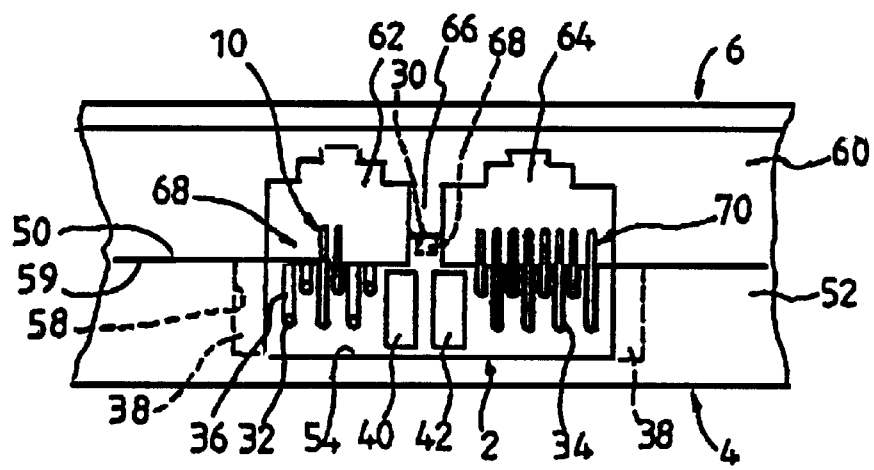
FIG. 3 is a partially elevational view of the notebook computer case showing two wired modular jacks in accordance with a preferred embodiment of the present invention.

As shown in FIGS. 2 and 3, a notebook computer case 1 in accordance with the present invention comprises: a wired modular jack insert 2, a lower case 4 and an upper case 6.

The wired modular jack insert 2 is substantially configured to a rectangular parallelepiped and comprises an insulation body 8 and a plurality of wires 10.

The body 8 has a front face 14, a rear face 16 opposite to the front face 14, a top face 18 connected between the front face 14 and the rear face 16, a first side face 20 and a second side face 22 opposite to the first side face 20. The first side face 20 and the second side face 22 connect with the front face 14 and the rear face 16.

The body 8 can be divided into two portions 24, 26 wherein the first portion 24 is constructed as a portion of a RJ11 jack and the second portion 26 is constructed as a portion of a RJ45 jack. A protrusion 28 is formed on the top face 18 of the body 8 and extends from the front face 14 to the rear face 16, which substantially separates the first portion 24 from the second portion 26 of the body 8. A hole 30 is further formed on the protrusion 28.

Six parallel channels 32 arranged in two horizontal staggering rows are formed through the first portion 24 of the body 8 from the front face 14 to the rear face 16. Further, eight parallel channels 34 also arranged in two horizontal staggering rows are formed through the second portion 26 of the body 8 from the front face 14 to the rear face 16.

Preferably, the front face 14 of the body 8 is formed with a plurality of parallel grooves 36 thereon, each extending from one of the channels 32, 34 to the top face 18 of the body 8.

In addition, two vertical protrusions 38 are respectively formed on the first side face 20 and the second side face 22 of the body 8. A first indicative device 40, generally a light-emitting diode (LED), is provided on the front face 14 of the body 8 between the channels 32 and the channels 34 for indicating the signal inputs and outputs of the built-in fax/modem card and/or the network card. Further, a second indicative device 42, generally a light-emitting diode (LED), is provided on the front face 14 and adjacent to the first indicative device 40 for showing the power on/off status.

Figure 4:
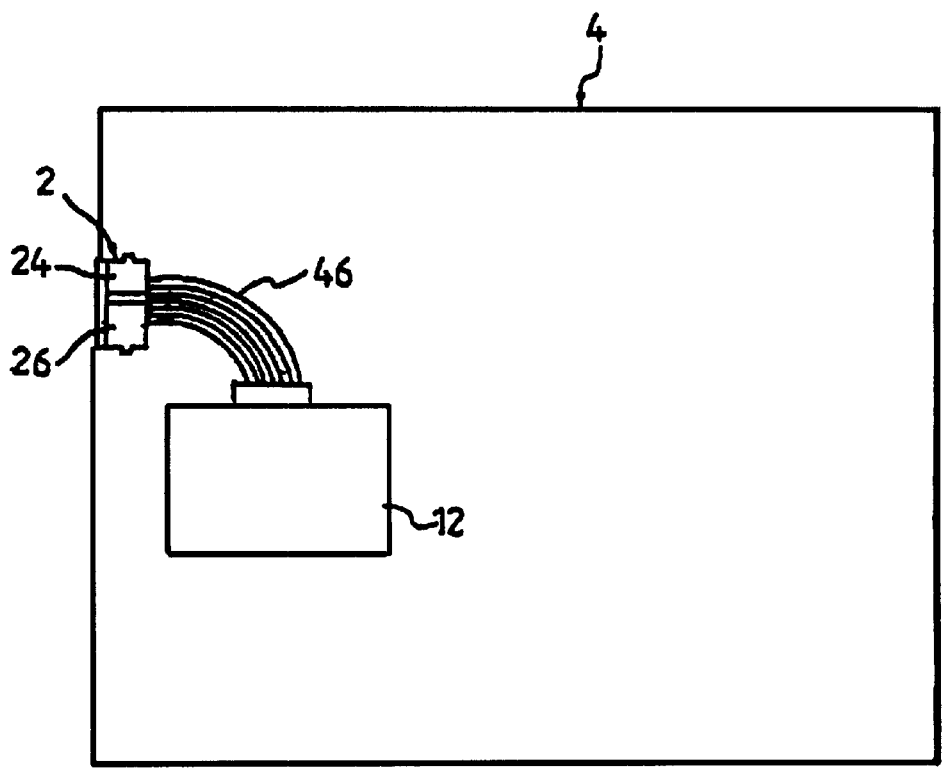
FIG. 4 is a top plan view of the notebook computer case showing two wired modular jacks in accordance with a preferred embodiment of the present invention, in which the arrangement of the lower case, the jack insert and the printed circuit board having a built-in fax/modem card and/or a network card is shown.

Each of the wires 10 extends through the channels 32 or the channels 34, and comprises a contact section 44 and a tail section 46. The contact section 44 projects from the front face 14 of the body 8 and is folded upward along the groove 36 to the top face 18 and then rearward away from the front face 14. The tail section 46 is embedded within the channels 32, 34 and further projects from the rear face 16 to connect with a fax/modem card or network card built in a printed circuit board 12 (see FIG. 4). Even though there are six channels 32 provided in the first portion 24, only two wires 10 are required for the conductive connection of a regular telephone line, as shown in FIGS. 2 and 3.

The lower case 4 has a lower side frame 48 which has a top 50 and an outer wall 52. The lower side frame 48 is configured to downward form a recess 54 from the top 50 thereof. The recess 54 of the lower side frame 48 is defined by two lateral walls 56 which are respectively provided with a vertical groove 58 for respectively receiving the vertical protrusion 38 of the body 8 and securing the body 8 in the lower side frame 48 of the lower case 4. Accordingly, the body 8 is removably mounted within the recess 54 with the front face 14 substantially flush with the outer wall 52 of the lower case 4.

The upper case 6 has an upper side frame 56 which has a bottom 59 and an outer wall 60. As the upper case 6 engages with the lower case 4, the outer wall 60 of the upper side frame 56 is substantially flush with the outer wall 52 of the lower side frame 48. The upper side frame 56 is configured to upward form two cavities 62, 64 from the bottom 59 thereof.

Further, the upper side frame 56 of the upper case 6 is provided with a wall 66 separating the cavity 62 from the cavity 64 and aligned with the protrusion 28 of the top face 18 of the body 8. The wall 66 is further provided with a post 68 for inserting into the hole 30 of the protrusion 28 on the top face 18 of the body 8.

When the upper case 6 is in engagement with the lower case 4, the modular jack insert 2 and the cavities 62, 64 define the modular jacks 68, 70 respectively adapted for insertion of a plug. The alignment of the protrusion 28 and the wall 66 securely separates the two jacks 68, 70 from each other. The modular jack 68 is used as a RJ11 jack and the modular jack 70 is used as a RJ45 jack.

Based on the above structure, a combined RJ11/RJ45 modular jack is formed. Since the height of the modular jack is determined by the upper case, the jack insert and the lower case, the height of the notebook computer case can be significantly reduced as long as the dimensions thereof are properly determined. Further, since there is only one protrusion between the first portion and second portion, the space required for the jack can be reduced such that the additional ports can be provided on the same outer wall of the computer case.

The above computer case is a preferred embodiment in accordance with the present invention. However, the computer case also be an integral case with a side wall which forms an opening for removably receiving the insert therein with the front face of the insert substantially flush with the side wall. Accordingly, when the insert is received within the opening, the modular jack insert and the opening define the modular jack adapted for insertion of a plug.

The structure of the present invention is not limited to the above embodiments. Although the invention has been described with reference to the preferred embodiments, it will be obvious to those skilled in the art that various changes and modifications may be made without departing from the scope of the invention as recited in the claims.

What is claimed is:

1. A notebook computer case with at least one modular jack, comprising:

a modular jack insert, which comprises a front face and a rear face opposite to the front face, a plurality of parallel channels being formed through the insert between the front face and the rear face; a first side face, a second side face opposite to the first side face, the first side face and the second side face connecting the front face and the rear face;

a side wall forming an opening for removably receiving the insert therein with the front face of the insert being adjacent the side wall; wherein the first side face and the second side face of the modular jack insert each comprise a vertical protrusion adapted for interlocking with the side wall;

thereby, when the insert is received within the opening, the modular jack insert and the opening define the modular jack adapted for insertion of a plug.

2. The notebook computer case according to claim 1, wherein the computer case comprises:

a lower case having a lower side frame which has a top and an outer wall, the lower side frame is configured to form a recess from the top thereof, the insert being removably mounted within the recess with the front face being adjacent the outer wall;

an upper case having an upper side frame which has a bottom and an outer wall being adjacent the outer wall of the lower side frame after engagement with the lower case, the upper side frame being configured to upward form at least one cavity from the bottom thereof;

thereby when the upper case is in engagement with the lower case of which the modular jack insert is mounted within the recess, the recess and the at least one of the cavities define the opening, and the modular jack insert and at least one of the cavities define the modular jack adapted for insertion of a plug.

3. A The notebook computer case according to claim 2, wherein the modular jack insert further comprises a plurality of contacts respectively extending through the channels and each including a contact section and a tail section, in which the contact section projecting outward from the front face of the insert and being folded rearward into the modular jack, and the tail section being embedded within the channel and projecting from the rear face of the insert.

4. The notebook computer case according to claim 2, wherein the front face of the insert is provided with a first indicative device thereon for indicating input and output signals through wires.

5. The notebook computer case according to claim 4, wherein the first indicative device is a light-emitting diode (LED).

6. The notebook computer case according to claim 2, wherein the front face of the insert is provided with a second indicative device thereon for showing a power on/off status.

7. The notebook computer case according to claim 6, wherein the second indicative device is a light-emitting diode (LED).

8. A notebook computer case, comprising:
a modular jack insert, which comprises a front face and a rear face opposite to the front face, a plurality of parallel channels being formed through the insert between the front face and the rear face; wherein the modular jack insert comprises a first portion and a second portion which correspond to two modular jacks; and wherein the modular jack insert comprises eight channels formed within the first portion and six channels formed within the second portion;
a lower case having a lower side frame which has a top and an outer wall, the lower side frame is configured to form a recess from the top thereof, the modular jack insert being removably mounted within the recess with the front face being adjacent the outer wall;
an upper case having an upper side frame configured to upward form two cavities from the bottom thereof to define two modular jacks; thereby when the upper case is in engagement with the lower case of which the modular jack insert is mounted within the recess, the recess and the two cavities define an opening;
thereby when the modular jack insert is received within the opening, the modular jack insert and the opening define the modular jack adapted for insertion of a plug.

9. The notebook computer case according to claim 8, wherein the insert further comprises a top face, which has a protrusion provided thereon from the front face to the rear face to separate the first portion from the second portion, in which the protrusion has a hole formed thereon, and wherein the upper side frame of the upper case is provided with a wall aligned with the protrusion of the top face of the insert, the wall is further provided with a post for inserting into the hole of the protrusion on the top face of the insert, thereby securely separating the two jacks from each other after the upper case is in engagement with the lower case.

10. A notebook computer case, comprising:
a modular jack insert, which comprises a front face and a rear face opposite to the front face, a plurality of parallel channels being formed through the insert between the front face and the rear face; wherein the modular jack insert is formed with a plurality of parallel grooves respectively extending on the front face upward from the channels, for upward guiding the contact sections of the wires;
a lower case having a lower side frame which has a top and an outer wall, the lower side frame is configured to form a recess from the top thereof, the modular jack insert being removably mounted within the recess with the front face being adjacent the outer wall;
an upper case having an upper side frame configured to upward form at least one cavity from the bottom thereof; thereby when the upper case is in engagement with the lower case of which the modular jack insert is mounted within the recess, the recess and the at least one of the cavities define the opening;
thereby when the modular jack insert is received within the opening, the modular jack insert and the opening define the modular jack adapted for insertion of a plug.

11. A notebook computer case, comprising:
a modular jack insert, which comprises a front face and a rear face opposite to the front face, a plurality of parallel channels being formed through the modular jack insert between the front face and the rear face; wherein the modular jack insert is substantially a rectangular parallelepiped which has a first side face and a second side face opposite to the first side face, the first side face and the second side face connecting with the front face and the rear face, in which the insert is provided with two protrusions respectively projecting outward from the first side face and the second side face, and the recess of the lower side frame is defined by two lateral walls which are respectively provided with a groove for respectively receiving the protrusion and securing the modular jack insert in a lower side frame of a lower case;
the lower case having the lower side frame which has a top and an outer wall, the lower side frame is configured to form a recess from the top thereof, the modular jack insert being removably mounted within the recess with the front face being adjacent the outer wall;
an upper case having an upper side frame configured to upward form at least one cavity from the bottom thereof; thereby when the upper case is in engagement with the lower case of which the modular jack insert is mounted within the recess, the recess and the at least one of the cavities define the opening;
thereby when the modular jack insert is received within the opening, the modular jack insert and the opening define the modular jack adapted for insertion of a plug.

12. An insulation modular jack insert for use with a notebook computer case, comprising:
a front face and a rear face opposite to the front face, a first side face, a second side face opposite to the first side face, the first side face and the second side face connecting the front face and the rear face, wherein at least one of the first side face or the second side face comprise a vertical protrusion, and a plurality of parallel channels being formed through the modular jack insert between the front face and the rear face;
the computer case having a side wall forming an opening for removably receiving the insert therein with the front face of the insert being adjacent the side wall, wherein the vertical protrusion(s) are adapted for interlocking insertion into the side wall of the computer case;
thereby when the modular jack insert is received within the opening, the modular jack insert and the opening define the modular jack adapted for insertion of a plug.

13. The insulation modular jack insert according to claim 12, wherein the computer case comprises:
a lower case having a lower side frame which has a top and an outer wall, the lower side frame is configured to form a recess from the top thereof, the insert being removably mounted within the recess with the front face being substantially flush with the outer wall;
an upper case having an upper side frame which has a bottom and an outer wall being adjacent the outer wall of the lower side frame after engagement with the lower case, the upper side frame being configured to upward form at least one cavity from the bottom thereof;

thereby when the upper case is in engagement with the lower case of which the modular jack insert is mounted within the recess, the recess and the at least one of the cavities define the opening, and the modular jack insert and at least one of the cavities define the modular jack adapted for insertion of a plug.

14. A wired modular jack insert, comprising:

a body, which includes a front face, a rear face opposite to the front face, and a plurality of parallel channels being formed through the insert between the front face and the rear face, a plurality of contacts respectively extending through the channels and each including a contact section and a tail section, in which the contact section projecting outward from the front face of the body and being folded upward along a groove in the front face and then rearward above the body, and the tail section being embedded within the channel and projecting from the rear face of the body.

* * * * *